United States Patent
Bryant et al.

(10) Patent No.: US 8,206,204 B2
(45) Date of Patent: Jun. 26, 2012

(54) CONTROL UNIT HEAT MANAGEMENT

(75) Inventors: Bruce Bryant, Manassas, VA (US);
Suresh Sureshbabu, Canton, MI (US);
Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1637 days.

(21) Appl. No.: 11/534,160

(22) Filed: Sep. 21, 2006

(65) Prior Publication Data
US 2008/0076342 A1 Mar. 27, 2008

(51) Int. Cl.
*F02B 3/10* (2006.01)
(52) U.S. Cl. .......................... 454/75; 123/299
(58) Field of Classification Search .................. 454/75; 236/1 B, 35, 49.3; 123/41.12, 299
See application file for complete search history.

(56) References Cited

U.S. PATENT DOCUMENTS

| | | | |
|---|---|---|---|
| 5,042,434 A | 8/1991 | Graf et al. | |
| 5,322,471 A | 6/1994 | Bauer et al. | |
| 5,669,813 A | 9/1997 | Jairazbhoy et al. | |
| 5,924,407 A | 7/1999 | Iwaszkiewicz et al. | |
| 6,088,631 A | 7/2000 | Kuehn et al. | |
| 6,574,545 B2 | 6/2003 | Hartke et al. | |
| 6,655,326 B2 | 12/2003 | Purcell et al. | |
| 6,750,630 B2 | 6/2004 | Inoue et al. | |
| 6,788,534 B2 | 9/2004 | Kinoshita et al. | |
| 2003/0146290 A1* | 8/2003 | Wang et al. .................. 236/49.3 |
| 2005/0082052 A1* | 4/2005 | Abdeljawad .................. 165/203 |
| 2006/0100057 A1* | 5/2006 | Severinsky et al. ............... 477/4 |

FOREIGN PATENT DOCUMENTS

| EP | 1024274 | 2/2000 |
|---|---|---|
| JP | 9126044 | 5/1997 |

* cited by examiner

*Primary Examiner* — Steven B McAllister
*Assistant Examiner* — Samantha Miller
(74) *Attorney, Agent, or Firm* — Julia Voutyras; Alleman Hall McCoy Russell & Tuttle LLP

(57) ABSTRACT

A method of cooling an engine control unit (ECU) coupled to an engine in a vehicle having a cabin climate control system, comprising operating the vehicle cabin climate control system according to a customer-based climate control setting during a first operating condition, and overriding said customer-based setting during a second operating condition including an ECU over-temperature condition.

12 Claims, 10 Drawing Sheets

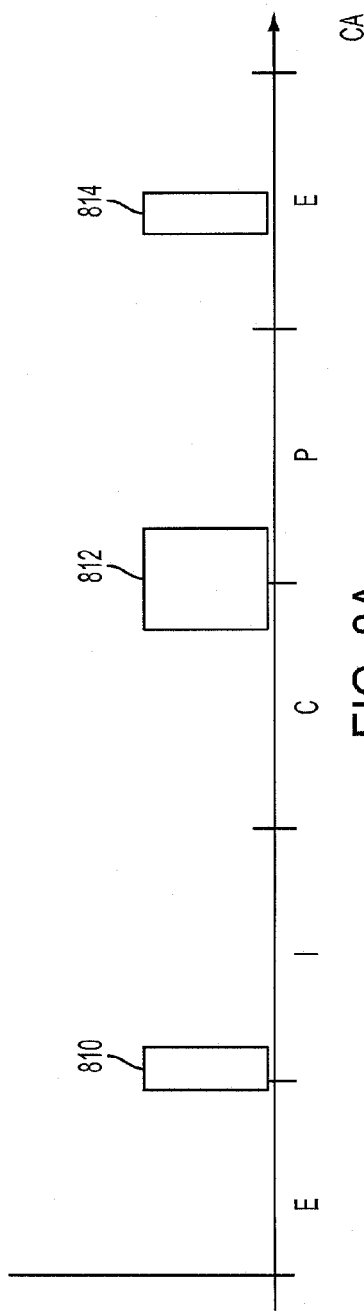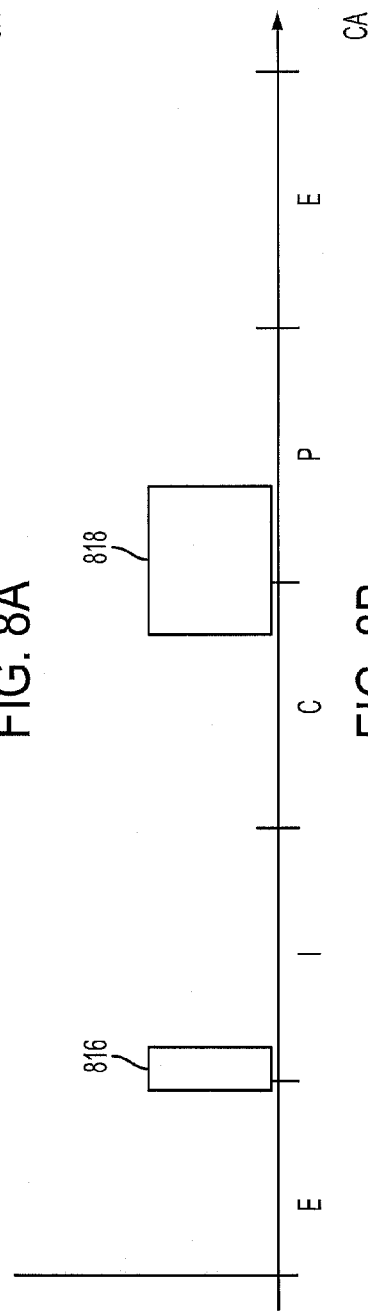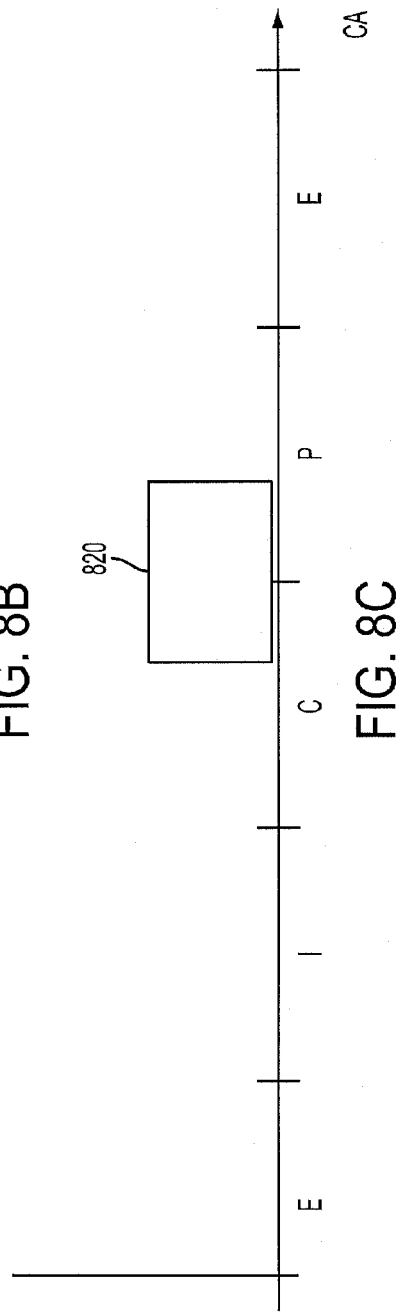

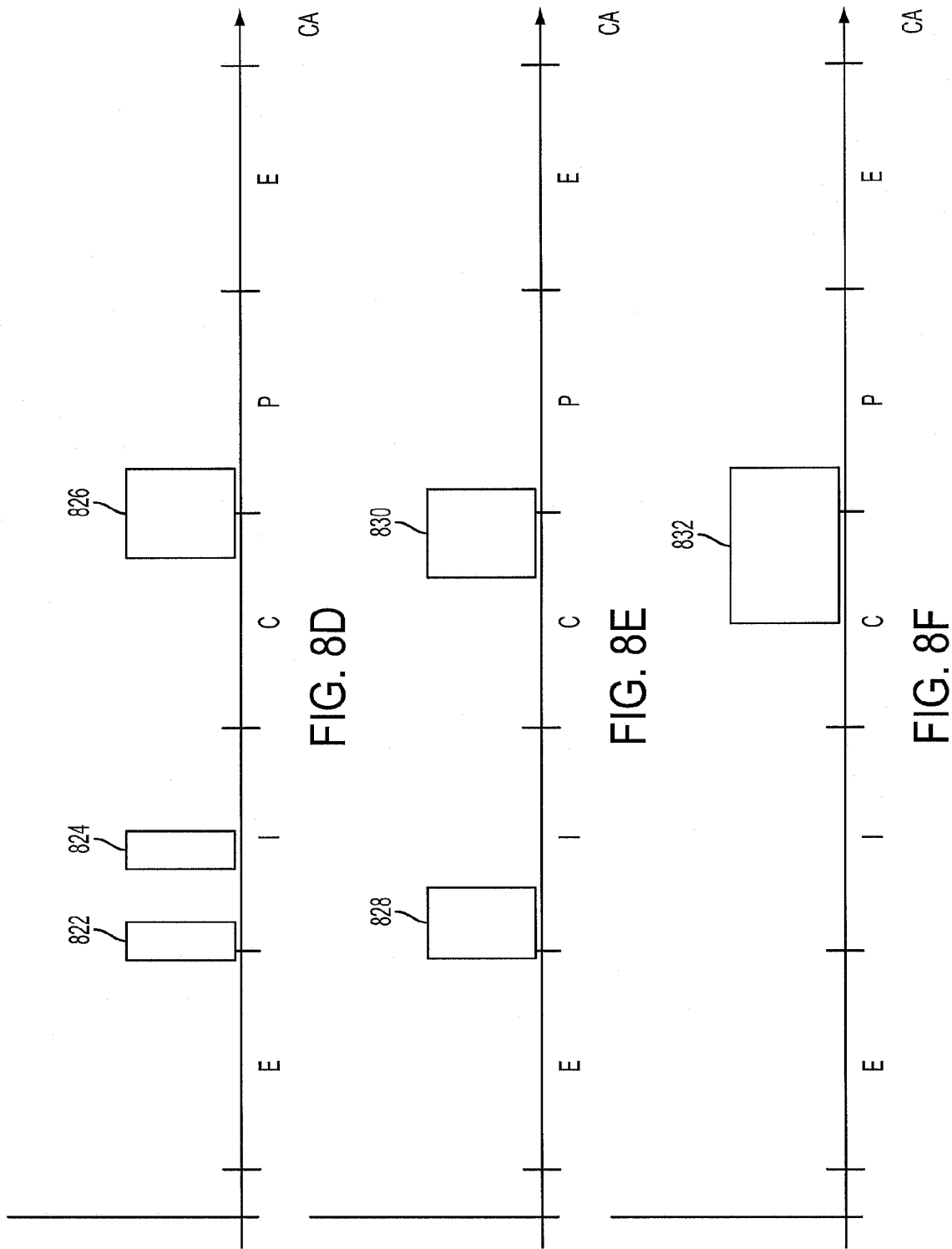

CONTROL UNIT HEAT MANAGEMENT

BACKGROUND AND SUMMARY

Internal combustion engines of an automobile may utilize an engine control unit (ECU) for electronically controlling engine operation. For example, the ECU may control the engine ignition system the engine as well as other vehicle or engine components, and may also be coupled to a plurality of sensors. In one example, the ECU may be located near or in the engine compartment such that significant heat energy generated by the engine and related components may be transferred to the ECU. As such, it is possible that there may an undesirable temperature rise due to heat buildup in the ECU, which may in turn cause degradation of the ECU and thus engine or other vehicle operation. Further, this heat buildup may be exacerbated by conduction or other transfer of heat from the systems adjacent to an enclosed space in which the ECU is located, and by the heat generated from the ECU itself.

To control or reduce ECU temperature, various forms of heat management may be used. One approach aims at cooling the ECU, either passively or actively. Another approach aims at reducing the amount of heat generated by the ECU. In one example approach aimed at cooling the ECU when a risk of overheating is imminent, heat in the ECU may be dissipated by switching on a fan, increasing the rate of coolant flow, or altering the temperature of the thermostat coupled to the engine cooling system. In cooling the ECU, airflow by air current through the enclosure or by a fan may be used to maintain the desired operating temperature of the ECU. Such an approach is described in U.S. Pat. No. 6,655,326.

However, the inventors herein have recognized that in certain operating systems, for example, when the climate control system is turned off or a recirculation mode is selected, airflow around the ECU and/or through its enclosure may be reduced or stagnated. As such, this may result in insufficient cooling of the ECU and potentially increasing a possibility of heat related degradation of the ECU. For example, when the climate control system is turned off, fans coupled to the system may not operate and reduced or no airflow may be blown past the ECU and/or into the passenger compartment. Likewise, when the recirculation mode is selected, either automatically or by a customer selection, there may be reduced or no airflow from exterior to the passenger compartment past the ECU because the vents are closed. Therefore, there may be insufficient cooling of the ECU under these and other situations.

The above issues may be at least partially addressed by compelling ventilation of the ECU enclosure during selected operating conditions in which ECU temperature may be higher than desired and overriding customer settings. For example, during selected higher ECU temperature conditions, the system may temporarily enable a climate control blower fan even when a customer has set the fan to off. Alternatively, the system may temporarily increase fan speed above that set by the operator. Likewise, the system may temporarily disable a recirculation mode (e.g., by opening or adjusting various communication vents) even when a customer has set the mode to recirculation.

Further still, in the example of an automatic climate control system, where the system sets various conditions such as fan speed and/or recirculation mode in response to a customer temperature command, these settings may be temporarily overridden to increase ECU cooling. Note that the conditions of ECU over-temperature may include operation at a high engine speeds (which may produce more heat in the ECU), operation at high load, (which may produce engine system heat that may be transferred to the ECU enclosure), operation at high ambient temperature (e.g., greater than 80 degrees F., for example), and/or operation at high measured temperatures in or near the ECU.

In this way, it is possible to increase the heat transfer from the ECU during selected ECU over-temperature conditions, for example.

DETAILED DESCRIPTION

Figure 1:
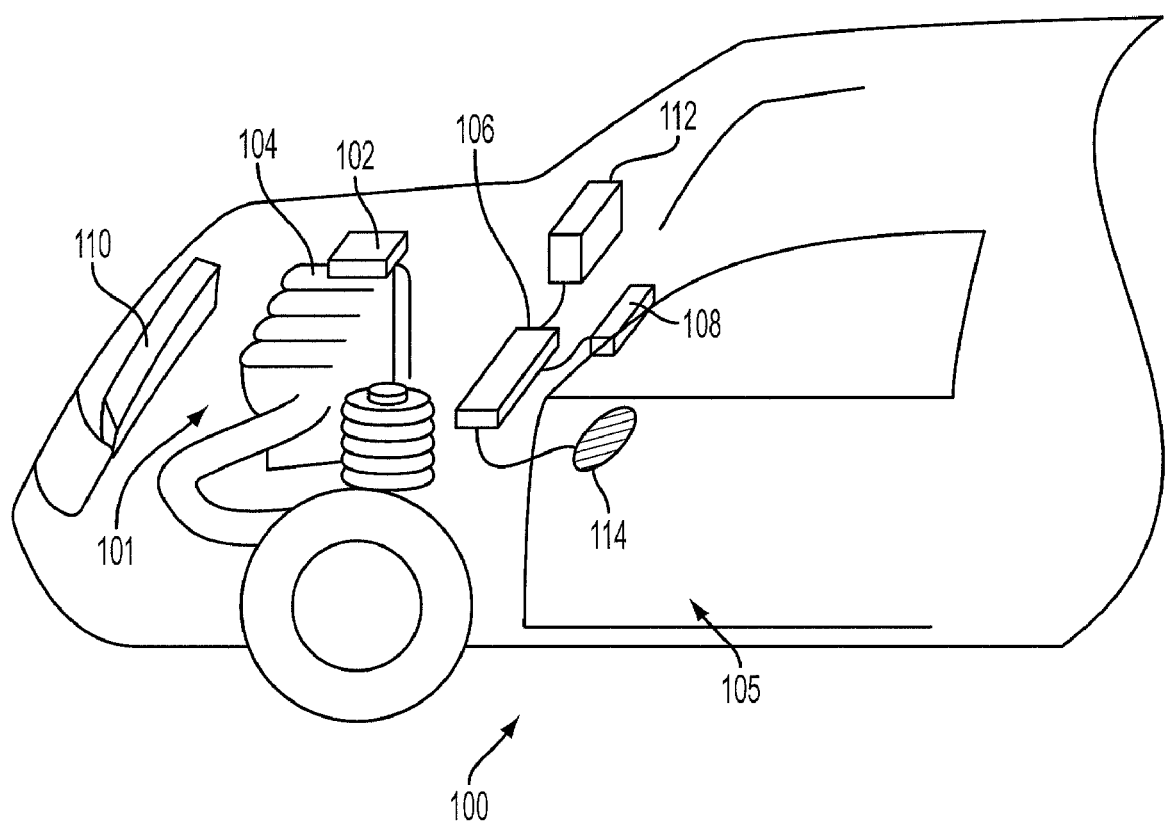
FIG. 1 shows a schematic diagram of an example vehicle and associated components.
Figure 6:
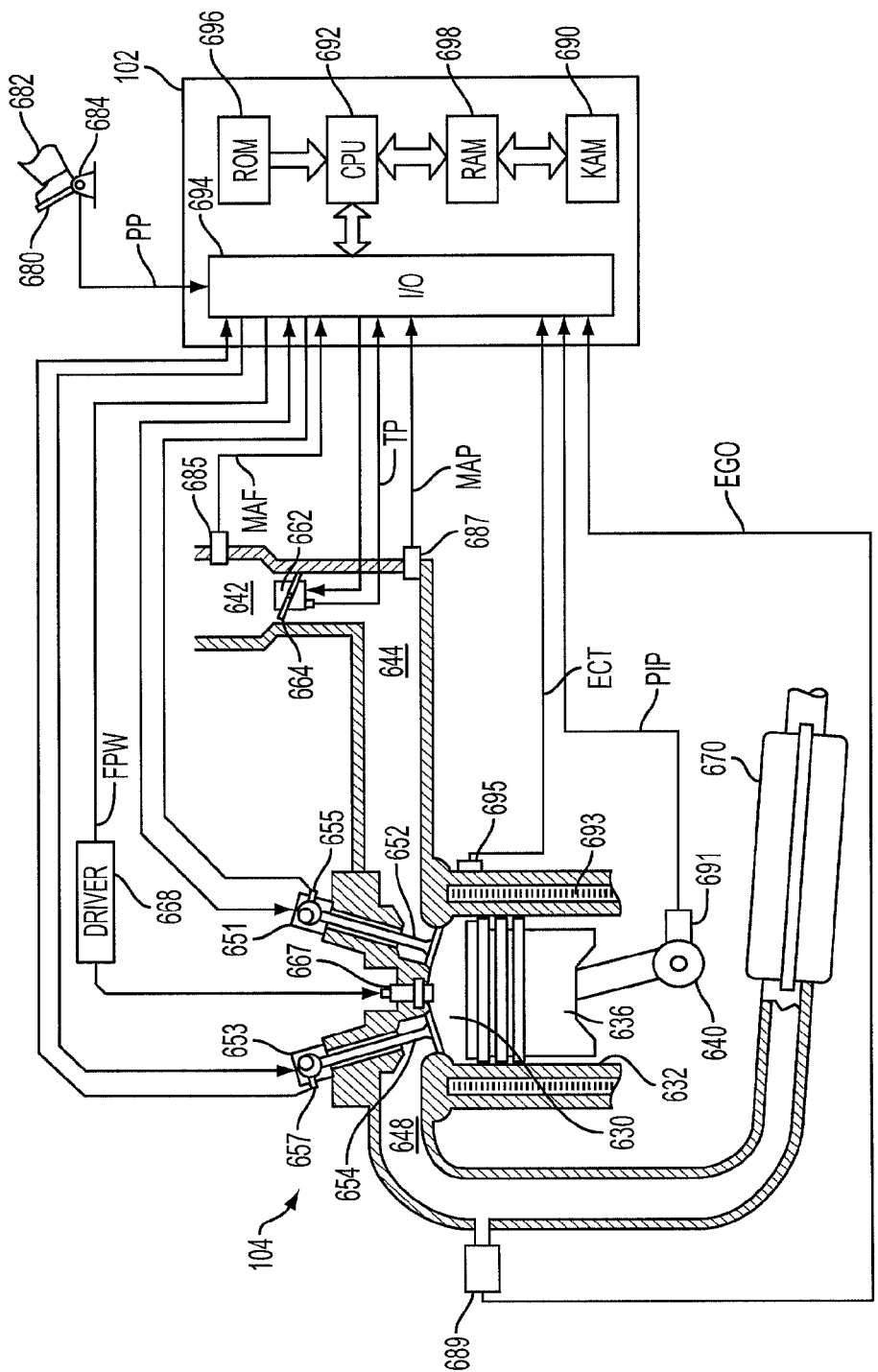
FIG. 6 shows a schematic engine diagram.

FIG. 1 shows the front part of automobile 100 with an engine compartment 101 having an internal combustion engine 104. Engine 104 may be a gasoline or diesel engine, such as a direct injection engine as shown in FIG. 6. An engine control unit (ECU) is designated as 102, where the ECU controls one or more function of the engine, such as fuel injection timing and/or amounts, ignition timing, and various others. The ECU may be located in various positions that may be proximate to or adjacent the engine or engine compartment. In the example of FIG. 1, the ECU is located adjacent and on top of the engine in the engine compartment 101. However, the ECU may also be located behind the engine, or proximate and/or adjacent to the passenger compartment, Additionally, the ECU may be located in, upstream of, downstream of, or near vents, such as a recirculation vent 106, leading to or from the passenger compartment, and/or in a position in which airflow around or near the ECU is affected at least by airflow in a climate control system of the passenger compartment of the vehicle, where the airflow may also pass through a vent, such as vent 106, and where at least a portion of the airflow may be affected by a fan, such as fan 112, before entering the cabin through one or more cabin vents, such as vent 114.

Vehicle 100 may further have a passenger or cabin climate control system that includes a heating-ventilation-air-conditioning (HVAC) system, at least a portion of which is designated at 105. The HVAC system may include a recirculation vent 106, which may be coupled to a climate control panel 108, as well as a fan 112, and interior cabin vent 114 (where cabin vent 114 may be adjusted by a customer or automatically controlled by the HVAC system, or both). The panel 108 may be located in the cabin of vehicle 100, such as on an instrument panel of the vehicle (not shown), for example. The climate control panel 108 may include various driver interfaces, such as buttons, knobs, settings, and the like for receiving a driver command or selection that is to control one or more features of the HVAC system, including vent 106 and/or fan 112. Further, while FIG. 1 shows a single vent and fan, there may be a plurality of vents and/or fans, either controlled together or individually.

In one example, the fan 112 and vent 106 are fluidly coupled with one or more passages leading to the interior of the cabin, such as through cabin vent 114. The fan/vent may be physically located within one or more passages which eventually lead to the cabin, or otherwise fluidly coupled to such passages to affect airflow through the passages and/or into the cabin. Further, the fan/vent may be in or coupled to a passage that draws air either externally from the cabin or internally from the cabin, depending on the position of the vent 106.

FIG. 1 also shows a radiator 110 which may be used to transfer heat from the engine via a working fluid which may be referred to as engine coolant.

Figure 2A:
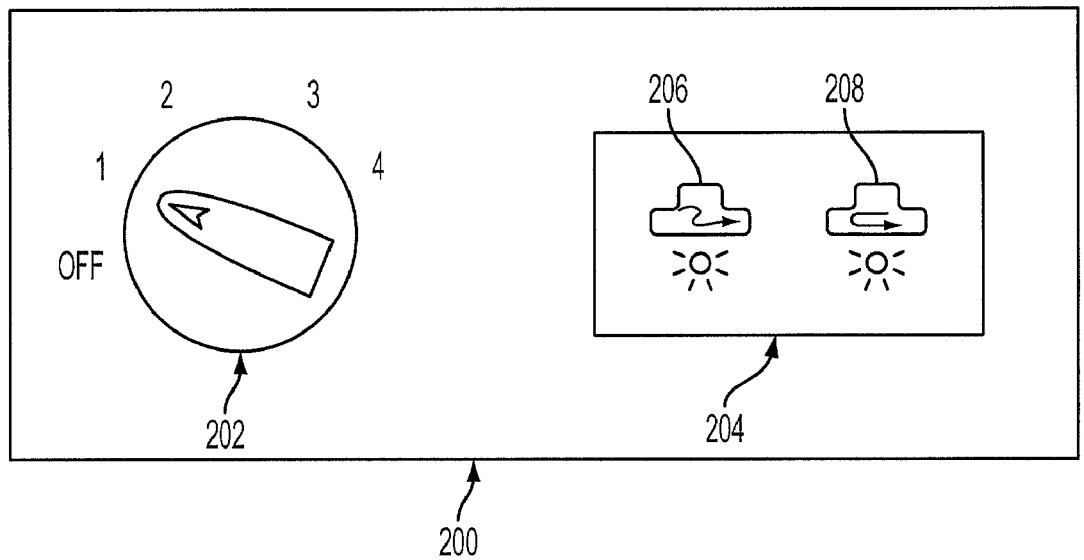
FIG. 2 shows example climate control interfaces.

FIG. 2A shows one example of a climate control panel that may be used in a passenger compartment, such as in system 105. A customer, driver, or vehicle passenger may choose a fan speed, temperature setting, recirculation mode, or other setting in a climate control panel 200. In one example, a recirculation mode setting adjusts a vent recirculation position (e.g., opening, closing, etc. of vent 106) which may adjust the fluid coupling of the inside of the cabin with the outside of vehicle. In one embodiment, in FIG. 2A, if the recirculation mode is "off" at 206 on the panel according to the customer setting, airflow would run from outside through recirculation vent 106 to the inside of the cabin. On the other hand, if the recirculation mode is on shown as 208, the airflow from outside may be blocked by shutting down the recirculation vents, and the airflow may be blown within the enclosure of the automobile, or stagnated.

FIG. 2A also shows a fan speed selection knob 202, which may be used for a customer to select a fan speed of a fan in the HVAC system, such as fan 112.

Figure 2B:
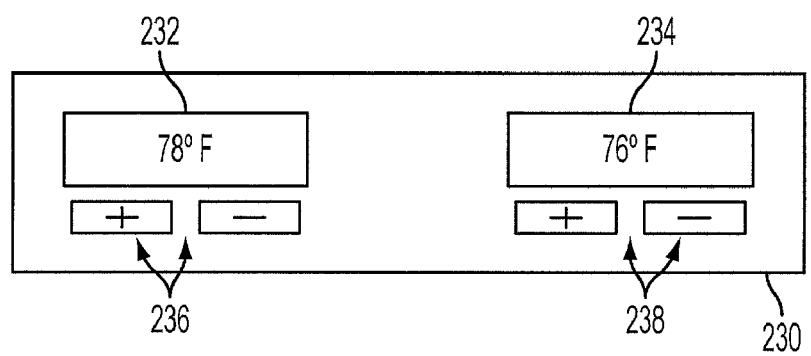

FIG. 2B shows an example of a portion of an interface 230 for an automatic climate control system, in which an operator inputs a desired interior temperature that is to be maintained by the system, and in particular can enter separate desired temperature (shown in displays 232 and 234) for the left and right side of the vehicle via inputs 236 and 238, respectively. In response, the climate control system may set one or more of fan speed, a/c compressor cycling, recirculation mode, and others to achieve the desired temperature setting. However, as noted herein, such settings may be temporarily overridden in response to monitoring of the ECU.

Figure 3:
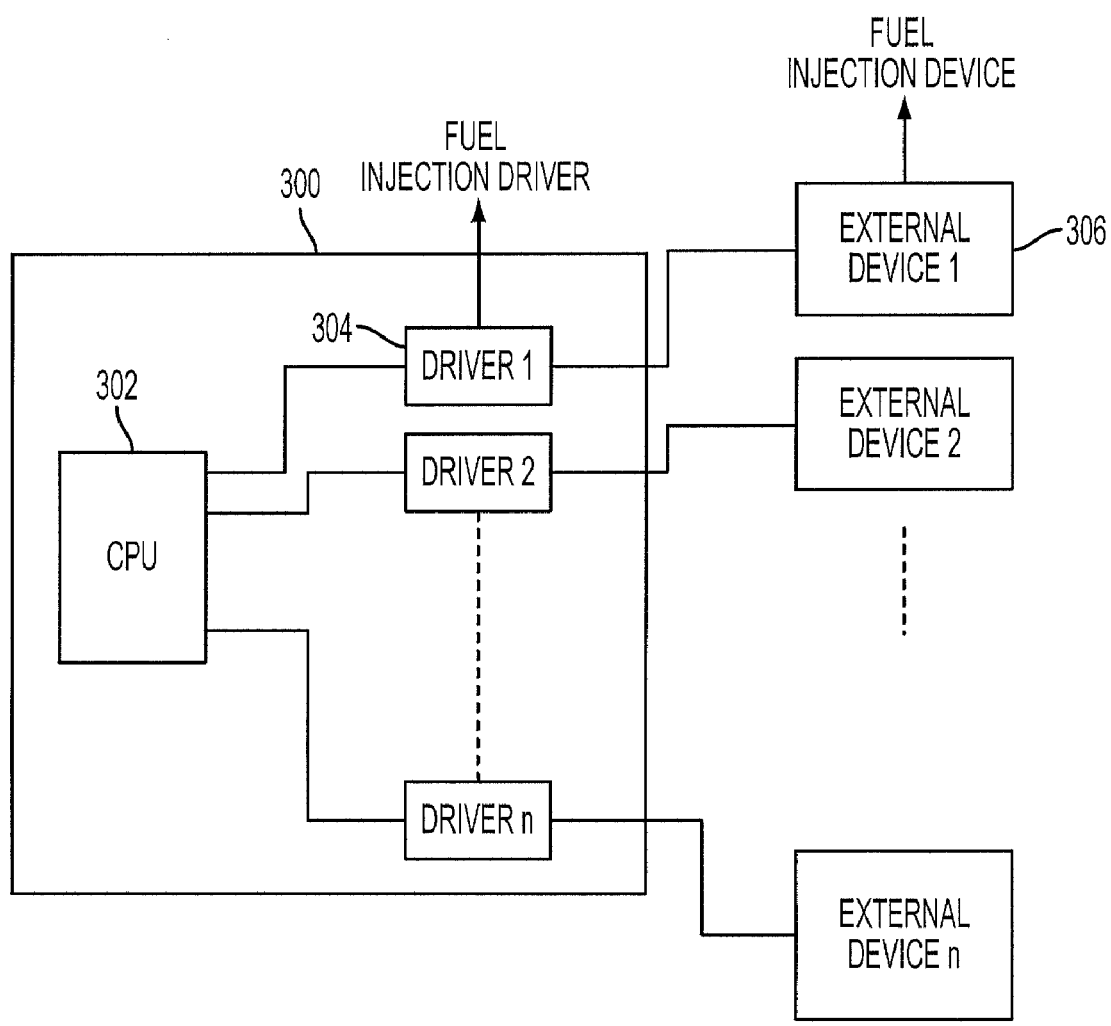
FIG. 3 shows a schematic diagram of an example controller and associated drivers.

In FIG. 3, an example ECU 300 is shown comprising central processor unit (CPU) 302 as a microprocessor to control one or more engine or vehicle actuators. In this example, the ECU includes a plurality of drivers 304 that control external devices 306 in the automobile. Further, the ECU may include a temperature sensor 308, which may be an ECU temperature sensor which measures the ECU or other driver temperature. A plurality of additional sensors may be coupled to the CPU so that the CPU may monitor and control the engine function.

The external devices 306 may include one or more engine fuel injectors and may also include an engine brake, an ignition unit, and/or a plurality of sensors with respect to the vehicle functions such as a coolant temperature sensor and ambient temperature sensor. In one example, a fuel injector having a piezo actuator may be one of the external devices 306, and a piezo fuel injector driver circuit may be one of drivers 304.

As such, the ECU may control the engine in response to information from various sensors located in various areas of the automobile by processing the inputs from the engine sensors in real time. However, even if the ECU is designed to operate within a broad range of temperature and/or includes its own internal cooling systems, heat sinks, and/or ECU fans, the ECU may still be affected by over-temperature conditions due to heat transferred from surrounding components, such as the engine, and/or internally generated heat. Since the engine may produce substantial heat during operation and the heat may affect ECU functionality and/or degradation, various additional actions may be taken to maintain the ECU and/or surrounding temperature within selected operating ranges and/or reduce heat transferred to the ECU and/or increase heat transferred from the ECU, various examples of which are described herein.

Figure 4:
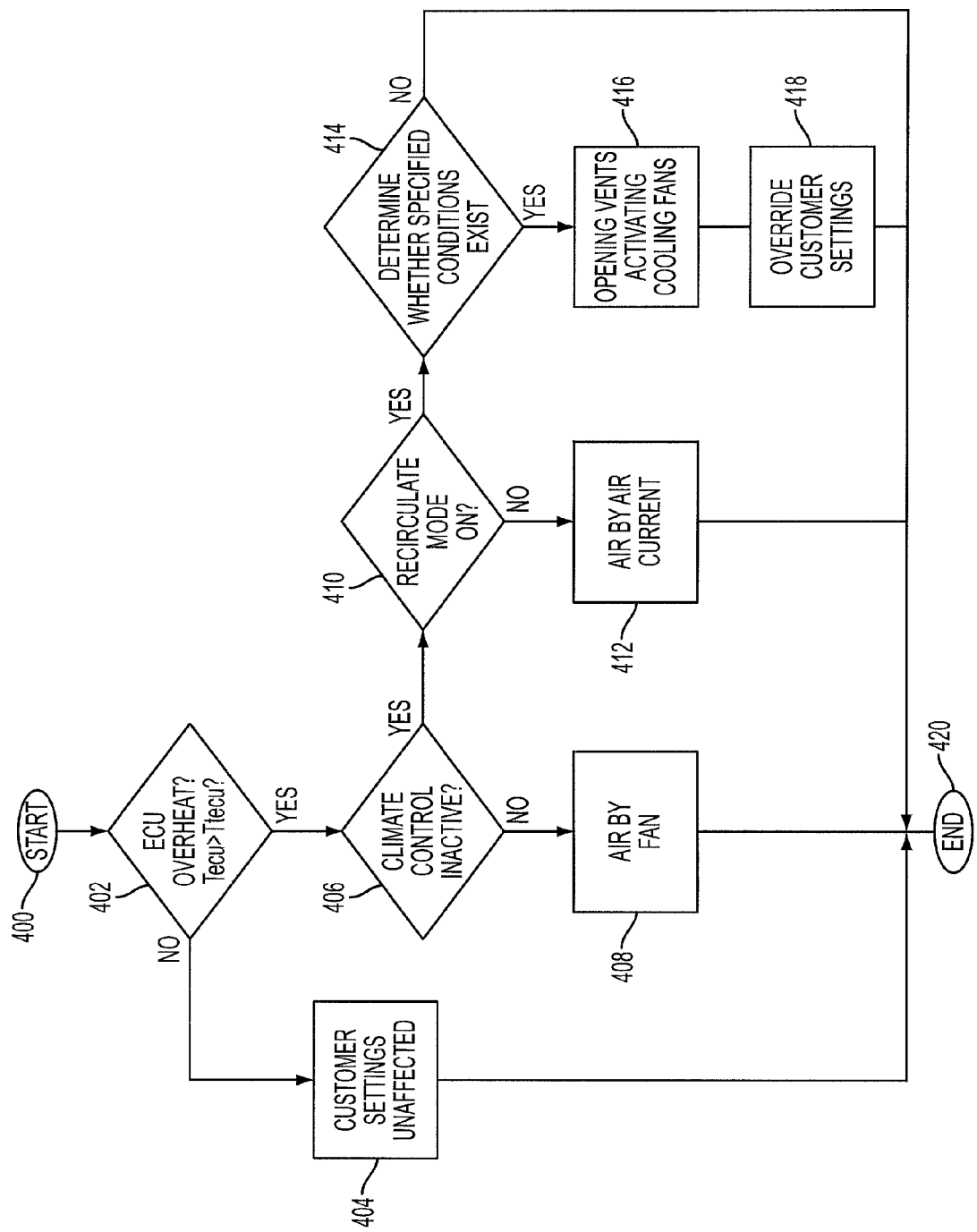
FIGS. 4-5, and 7 show example high level flowcharts of example operation.

FIG. 4 shows a flow chart of one example control approach in which ECU temperature and/or heat transfer may be monitored and adjusted. Specifically, the routine may adjust airflow generated in the ECU and/or around the ECU via HVAC recirculation vents in the vehicle cabin climate control system and/or via fan speed of a fan in the HVAC system of the vehicle cabin climate control system.

For example, in one approach, climate control settings of a vehicle operator and/or passenger may be at least temporarily overridden (e.g., overridden for less than the full operation time of the HVAC, or for only a few seconds or minutes) to increase ECU cooling and/or decrease or maintain ECU temperature. In one particular example, customer settings may be overridden to create or increase airflow across the ECU by first opening one or more recirculation vents, and then by increasing HVAC climate control system fan speed. Such overriding operations may be continued until ECU temperature reaches a predetermined operating temperature range. Alternatively, such overriding action may be periodically performed when ECU temperature is above a threshold value.

In one embodiment, ECU temperature may be measured by a plurality of sensors and a controller may determine whether the temperature is above a threshold value and/or a current situation is within a range of selected ECU over-heating conditions according to the various criteria, such as 1) operating at a high engine speed, which produces more heat in the ECU, 2) high load, which produces engine system heat that may be transferred to the ECU enclosure, 3) high ambient temperature, and/or 4) high measured or estimated temperature in or near the ECU, while the climate control system is selected "off" and recirculation mode is selected. Throughout vehicle and engine operation, the controller continues to monitor temperatures and/or other conditions at predetermined intervals, for example at a selected execution rate. During such monitoring and control, customers may choose settings on a climate control panel which may include, for example, a fan operation setting and/or speed, a desired cabin temperature, and/or a recirculation mode as their preference. However, temperature of the ECU may potentially be increased due to heat buildup as to cause temperature-related ECU degradation under certain customer settings. For example, a customer may choose recirculation mode when there is irritating air outside of the vehicle in order to prevent such air from flowing into the passenger compartment, and also may choose to turn off the climate control system when airflow within the passenger compartment is not desired. Those situations may meet the customer satisfaction, but may also generated increased heating and/or temperature of the ECU under selected engine or vehicle operating as heat buildup may be accelerated. As such, additional cooling may be needed to reduce heat related degradation of the ECU, such as by temporarily overriding customer recirculation vent and/or fan speed settings, as described in more detail in FIG. 4.

Specifically referring now to FIG. 4, at 402, the ECU may determine whether the ECU temperature measured by sensor 308, an ambient temperature sensor and/or a coolant temperature sensor are within selected ranges in which ECU heat related degradation is reduced. If so, e.g., the ECU temperature ($T_{ECU}$) is more than a predetermined threshold temperature of the ECU ($Tt_{ECU}$), the routine advances to 406 to measure whether or not a climate control is selected inactive, such as by being selected by the operator to an "off" condition. Otherwise, 402 proceeds to an end of the routine through 404 where customer settings are unaffected by temperature control actions, and the customer selections of fan speed, desired temperature and/or recirculation mode are provided by the controller.

Continuing with FIG. 4, if a driver selects the climate control system to be "off" or inactive at 406, the routine checks whether the recirculation mode is selected at 410. For example, in selected conditions, a driver may choose not to turn on any of the heater, air conditioner, and fan, and may select the system to be off, in which case little or no fresh air may be drawn into the passenger compartment through the recirculation vents (e.g., the driver may have the vehicle windows open). Under this situation, the routine proceeds to check whether the recirculation mode is selected as shown in 410 in order to determine whether there is any airflow from outside through the ECU enclosure and recirculation vents since customer setting may block such airflow. If both the climate control is off at 406 and the recirculation mode is selected at 410 according to the customer settings, it may be possible for the engine to increase heat buildup as to cause heat related ECU degradation, and therefore the routine takes may take the actions designated at 416 and 418 discussed further below. Also, various alternative approaches may be used, rather than checking a climate control system on/off, such as whether a fan is selected to be off, whether a condition is present indicating airflow is being generated by the climate control system across the ECU, or various others.

If, on the other hand, the climate control is selected "on," in other words, if no at 406, airflow may be drawn through the ECU enclosure because the climate control permits airflow to some degree. Accordingly, the airflow which may be generated by fan 112, for example, is provided during the vehicle operation to maintain heat transfer from the ECU and/or ECU temperature as shown in 408. However, in some conditions, the airflow generated by one or more fans may not sufficiently cool the ECU temperature to a desired range, especially when the air conditioner and/or increased engine load is present and/or during high ambient temperatures. Under such conditions, which may be monitored via a measured or estimated ECU temperature, additional actions may be taken to adjust engine or vehicle operation to reduce internally generated ECU temperature and/or reduce engine and/or powertrain generated heat, as discussed in more detail below herein, such as with regard to FIGS. 6-7.

Now referring to 412 where the recirculation mode is not selected, airflow generated by vehicle motion and drawn from outside the cabin into the cabin through the recirculation vents may be used to cool ECU temperatures to some degree. Again, however, such action may be insufficient to maintain desired ECU temperatures under some conditions, such as during low or stopped vehicle motion and/or during high ambient temperatures. Again, additional actions may be taken to adjust engine or vehicle operation to reduce internally generated ECU temperature and/or reduce engine and/or powertrain generated heat, as discussed in more detail below herein, such as with regard to FIGS. 6-7.

Referring now to 414 when the answer to 410 is yes, there may insufficient fresh air passing from outside the vehicle cabin into the cabin through the recirculation vent, and ECU temperature may reach or be more than a selected threshold temperature which may cause heat related ECU degradation. As such, the routine determines at 414 whether any selected conditions exist, including, for example, one or more of 1) operating at a high engine speed, 2) operating at a high engine load, 3) operating at a high ambient temperatures, and/or 4) operating at a high measured or estimated temperature in or near the ECU. Such conditions may occur while the climate control system is selected "off" and recirculation mode is selected.

When the answer to 414 is yes, the routine proceeds to 416. At 416, one of more fans of the HVAC system, such as fan 112, may be activated and one or more closed recirculation vents, such as vent 106, and/or interior cabin vents may be opened or opened further as to generate increased airflow across the ECU and/or through its enclosure. As such, customer settings for climate control and/or recirculation mode may be overridden until a desired temperature which is less than a threshold temperature (e.g., $Tt_{ECU}$) is obtained or a predetermined condition according to the condition of ECU over-temperature is reached. The overriding of customer settings may include, for example, disengaging and/or engaging an air compressor, overriding interior cabin temperature settings, turning off the recirculation mode, and/or overriding air distribution setting.

In one particular example, actions may be taken sequentially or concurrently, depending on operating conditions. For example, vent settings may be overridden before fan speed is overridden, or vice versa, as discussed in FIG. 5, for example. In addition, the adjustment of fan speed, if any, may be varied depending on a degree of ECU over-temperature. For example, increasing fan speeds above the customer setting may be provided in response to a degree of ECU over-temperature compared to the threshold temperature, for example. The fan speed adjustment may be linearly related to the over-temperature amount, for example.

In this way, it is possible to adjust one or more cabin climate control parameters from to provide reduce heating of one or more control units, such as ECU 102.

Figure 5:
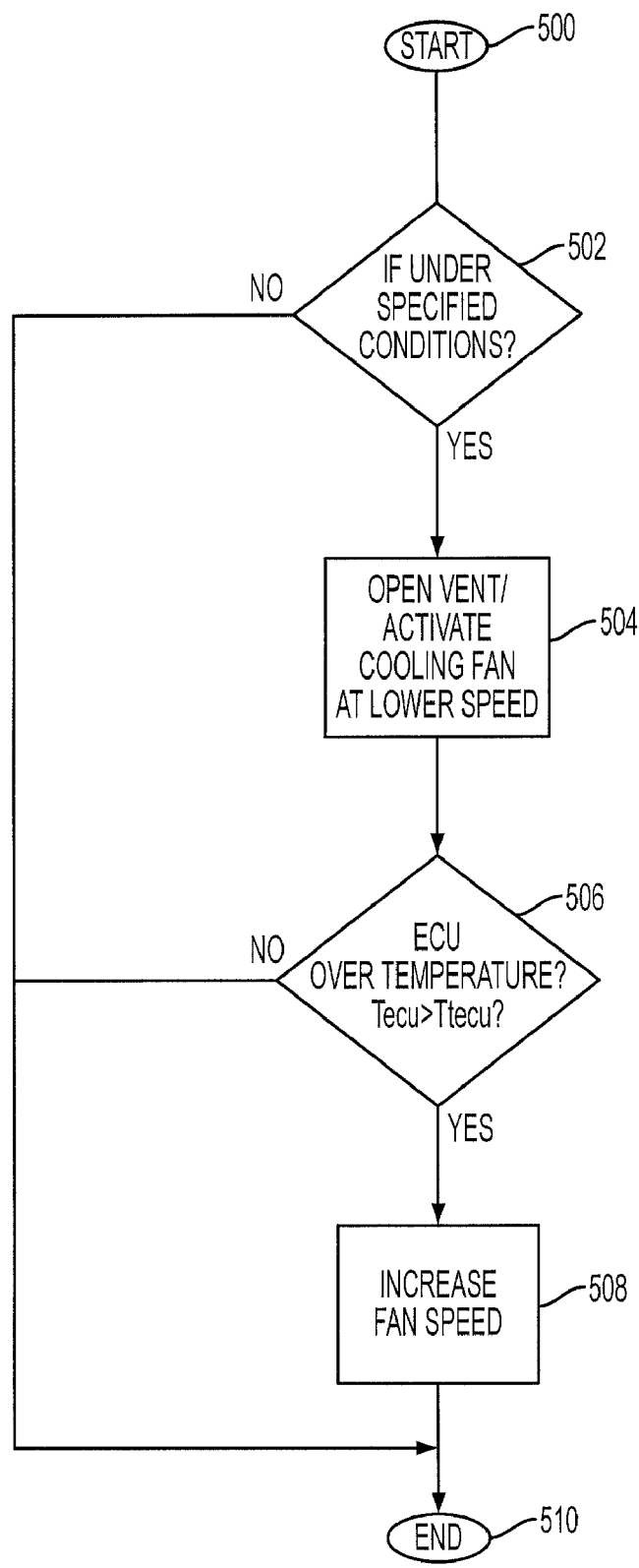

Referring now to FIG. 5, a routine is described showing one particular example of an order of operation that may be carried out at 416 of FIG. 4.

First, at 502, the routine determines if current operating conditions are with selected conditions for overriding of customer settings, as noted herein. For example, the routine may determine whether ECU temperature is above a first temperature threshold. If so, the routine continues to 504 to adjust one or more closed recirculation or other cabin HVAC vents from the current setting (which may include a customer override) to an open or more opened position and activate one or more of the cabin HVAC system fans at a predetermined speed. For example the predetermined speed may be based on the level of ECU over-temperature, and may further adjust vent position or fan speed based on one or more engine, vehicle, and/or ambient conditions. Further, the predetermined fan speed may include an off position, or no adjustment to the customer-based fan speed setting. Then, at 506, if additional cooling or flow is need due to ECU temperature rising above a second, higher, threshold ($Tt_{ECU}$), the routine may further increase fan speed in 508.

In this way, during less sever ECU over-temperature conditions, vent adjustments (possibly without fan speed adjustments) from customer-based settings may be used, which may be less noticeable to the vehicle driver and/or passengers. Then, when needed, more noticeable changes to operation (e.g., fan operation and/or speed) may be used. As such, less customer distraction may be achieved.

The above mentioned embodiments may be applied to various climate control systems, including manual fan and vent settings, automatic settings based on desired temperature, and various others. Also, rather than or in addition to measured ECU temperatures from one or more sensors, the routines herein may use an anticipated or estimated temperature according to a programmed model based on various engine, ambient, and/or vehicle operating parameters.

As noted herein, additional actions may be taken under selected conditions to further address ECU temperature and/or heat transfer. Specifically, in one embodiment, engine operation of a diesel and/or gasoline engine may be adjusted to reduce at least internally generated heat in the ECU, such as by adjusting a number of injections performed for a cylinder during one or more engine cycles.

For example, pilot and post injections in a diesel engine may be used to provide selected performance under specified conditions. Pilot injection may be used to reduce emissions and improve combustion by being injected just before a main injection, and post injection may be used to further reduce emissions by burning soot produced during combustion.

FIG. 6 is a schematic diagram showing one cylinder of multi-cylinder diesel engine 104, which may be included in a propulsion system of an automobile. Engine 104 may be controlled at least partially by a control system including controller 102 and by input from a vehicle operator 682 via an input device 680. In this example, input device 680 includes an accelerator pedal and a pedal position sensor 684 for generating a proportional pedal position signal PP. Combustion chamber (i.e. cylinder) 630 of engine 104 may include combustion chamber walls 632 with piston 636 positioned therein. Piston 636 may be coupled to crankshaft 640 so that reciprocating motion of the piston is translated into rotational motion of the crankshaft. Crankshaft 640 may be coupled to at least one drive wheel of the passenger vehicle via a transmission system. Further, a starter motor may be coupled to crankshaft 640 via a flywheel to enable a starting operation of engine 104.

Combustion chamber 630 may receive intake air from intake passage 644 via intake manifold 642 and may exhaust combustion gases via exhaust passage 648. Intake passage 644 and exhaust passage 648 can selectively communicate with combustion chamber 630 via respective intake valve 652 and exhaust valve 654. In some embodiments, combustion chamber 630 may include two or more intake valves and/or two or more exhaust valves.

In this example, intake valve 652 and exhaust valves 654 may be controlled by cam actuation via respective cam actuation systems 651 and 653. Cam actuation systems 651 and 653 may each include one or more cams and may utilize one or more of cam profile switching (CPS), variable cam timing (VCT), variable valve timing (VVT) and/or variable valve lift (VVL) systems that may be operated by controller 102 to vary valve operation. The position of intake valve 652 and exhaust valve 654 may be determined by position sensors 655 and 657, respectively. In alternative embodiments, intake valve 652 and/or exhaust valve 654 may be controlled by electric valve actuation. For example, cylinder 630 may alternatively include an intake valve controlled via electric valve actuation and an exhaust valve controlled via cam actuation including CPS and/or VCT systems.

Fuel injector 667 is shown coupled directly to combustion chamber 630 for injecting fuel directly therein in proportion to the pulse width of signal FPW received from controller 102 via electronic driver 668. In this manner, fuel injector 667 provides what is known as direct injection of fuel into combustion chamber 630. The fuel injector may be mounted in the side of the combustion chamber or in the top of the combustion chamber, for example. Fuel may be delivered to fuel injector 667 by a fuel system (not shown) including a fuel tank, a fuel pump, and a fuel rail. In some embodiments, combustion chamber 630 may alternatively or additionally include a fuel injector arranged in intake passage 644 in a configuration that provides what is known as port injection of fuel into the intake port upstream of combustion chamber 630.

Intake manifold 642 may include a throttle 662 having a throttle plate 664. In this particular example, the position of throttle plate 664 may be varied by controller 102 via a signal provided to an electric motor or actuator included with throttle 662, a configuration that is commonly referred to as electronic throttle control (ETC). In this manner, throttle 662 may be operated to vary the intake air provided to combustion chamber 630 among other engine cylinders. The position of throttle plate 664 may be provided to controller 102 by throttle position signal TP. Intake manifold 642 may include a mass air flow sensor 685 and a manifold air pressure sensor 687 for providing respective signals MAF and MAP to controller 102.

Exhaust gas sensor 689 is shown coupled to exhaust passage 648 upstream of emission control device 670. Sensor 689 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 670 is shown arranged along exhaust passage 648 downstream of exhaust gas sensor 689. Device 670 may be a three way catalyst (TWC), NOx trap, particulate filter, various other emission control devices, or combinations thereof. In some embodiments, during operation of engine 104, emission control device 670 may be periodically reset by operating at least one cylinder of the engine within a particular air/fuel ratio.

Controller 102 is shown in FIG. 6 as a microcomputer, including microprocessor unit 692, input/output ports 694, an electronic storage medium for executable programs and calibration values shown as read only memory chip 696 in this particular example, random access memory 698, keep alive memory 690, and a data bus. Controller 102 may receive various signals from sensors coupled to engine 104, in addition to those signals previously discussed, including measurement of inducted mass air flow (MAF) from mass air flow sensor 685; engine coolant temperature (ECT) from temperature sensor 695 coupled to cooling sleeve 693; a profile ignition pickup signal (PIP) from Hall effect sensor 691 (or other type) coupled to crankshaft 640; throttle position (TP) from a throttle position sensor; and absolute manifold pressure signal, MAP, from sensor 687. Engine speed signal, RPM, may be generated by controller 102 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 691, which is also used as an engine speed sensor, may produce a predetermined number of equally spaced pulses every revolution of the crankshaft.

As described above, FIG. 6 shows only one cylinder of a multi-cylinder engine, and that each cylinder may similarly include its own set of intake/exhaust valves, fuel injector, etc.

Fuel injector 667 may be actuated by an integrated piezo actuator having a piezo element or stack. The piezo actuator may enable improved repeatability of fuel injection with high frequency piezo material characteristics. However, since the amount of heat generated by piezo fuel injector driver circuits may be approximately proportional to the number of injections per unit time or per crank angle degree at a given speed, the heat generated within a piezo fuel injector driver may be greater than that generated by other fuel injector driver circuits. The heat may be due to electronic inefficiencies experienced during the charging and discharging of the piezo material within the injector and the fast switching ability of a piezo actuator fuel injector. Accordingly, a diesel engine controller with an integrated piezo fuel injector driver circuitry may generate increased heat, which may contribute approximately 50% to 60% of the total heat generated by an ECU coupled to a diesel engine. Even further heat may be generated when using multiple injections per cycle (e.g., per 720 degrees of crank revolution), such as when using pilot and/or post injections, or split main injections (e.g., two or more main injections during the intake and/or compression stroke).

Under some conditions, the heat buildup may be reduced by turning off non-essential drivers that dissipate heat when they are energized. Also, under some conditions the drivers controlling the fuel supply and/or injectors may be limited or deactivated to reduce heat generation by operating engine at part load with a reduced fuel supply to all of the cylinders or shutting off fuel supply to selected cylinders. However, as noted above, such action can be recognized by the vehicle operator and reduce drive feel and/or performance, at least under some conditions such as high engine torque or load demands.

Thus, under selected conditions, the number of the number of injections per cycle may be adjusted (e.g., limited or reduced) in one or more cylinders during conditions of ECU over-temperature, such as operation at a high engine speed (which may produce more heat in the ECU), operation at high load (which may produce engine system heat that may be transferred to the ECU enclosure), operation at high ambient temperature, operation at high measured temperature in or near the ECU, and/or conditions that may inhibit airflow around the ECU or through its enclosure.

Figure 7:
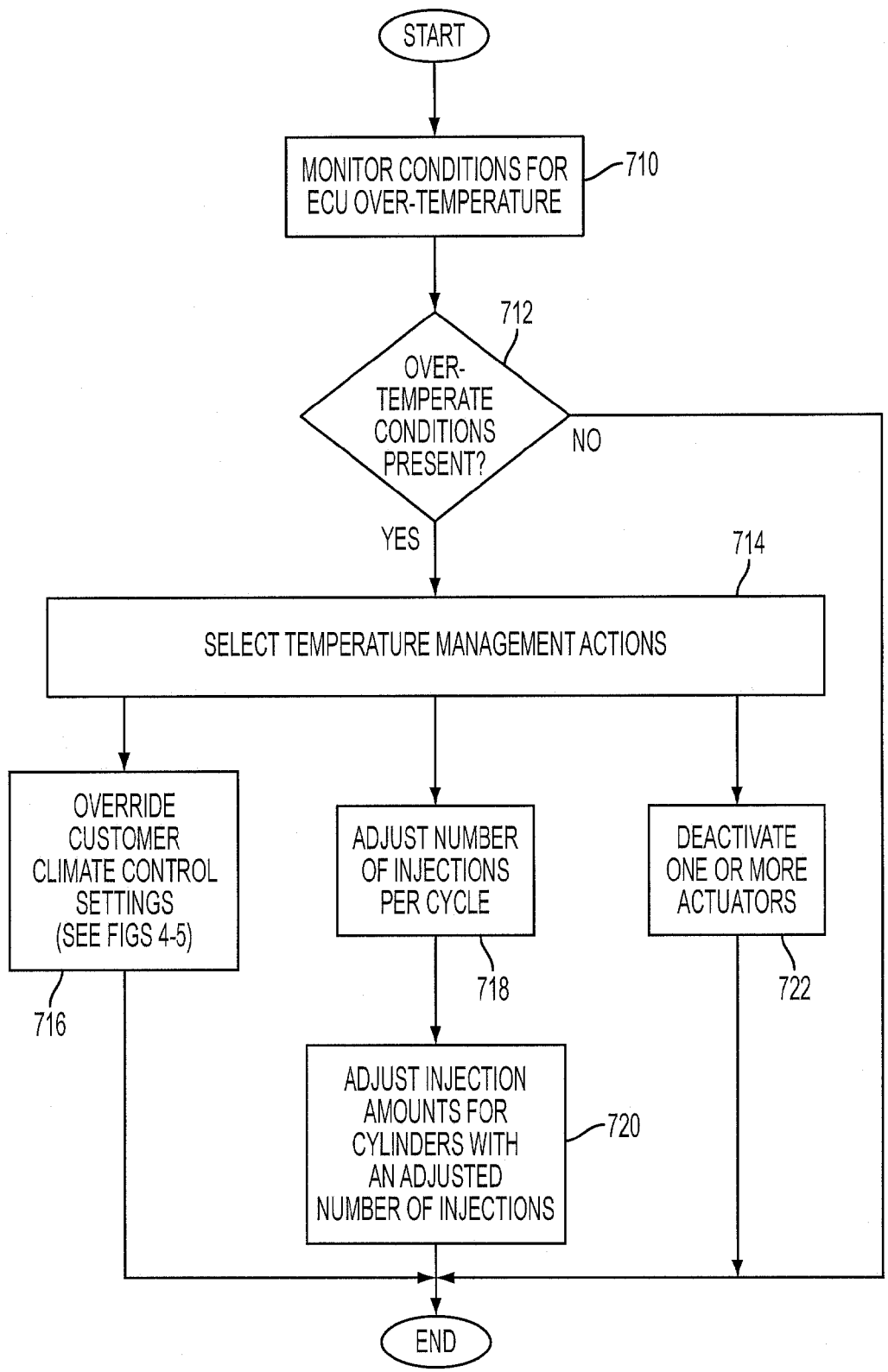

Referring now to FIG. 7, it shows an exemplary flowchart for adjusting fuel injection to reduce heat generation in an ECU, among other actions. First, in 710, the routine monitors conditions for potential of ECU over-temperature operation. This may include estimating temperature at or in the ECU, or identifying conditions in which ECU temperature may rise above a threshold temperature. For example, the conditions may include operation at a high engine speed (which may produce more heat in the ECU), operation at high load (which may produce engine system heat that may be transferred to the ECU enclosure), operation at high ambient temperature, operation at high measured temperature in or near the ECU, and/or conditions that may inhibit airflow around the ECU or through its enclosure.

In one example, the ECU temperature may be estimated based on a plurality of operating conditions, including the number of injections per cylinder and the timing of the injections. Specifically, the amount heat generated by piezo fuel injector driver circuits may be approximately proportional to the number of injections per unit time, which can be expressed as: # injections per cylinder event*# cylinder events per revolution*revolutions per minute X joules of excess heat are generated by each injection, which translates to Y watts at Z RPM when W injections are commanded per cylinder event.

Next, in 712, the routine determines whether one or more over-temperature conditions have been identified, and if so continues to 714 to select one or more appropriate temperature management actions. For example, depending on the severity of over-temperature operation (e.g., based on the amount by which estimated ECU temperature is above a threshold value) and based on vehicle and/or engine operating conditions, the routine may select one or more of the actions of 716 through 722. For example, during conditions where multiple injections per cycle are not being performed, the routine may select overriding of customer climate control settings in 716, which is described herein with regard to FIGS. 4-5, for example. Alternatively, when multiple injections are being performed in one or more cylinders, the routine may adjust the number of injections per cycle in 718, and then adjust the amount of remaining injections in 720 to maintain desired engine output. In still another example, such as where multiple injections are not present and customer settings have already been overridden, the routine may deactivate injection to one or more engine cylinders in 722. In this way, ECU overheating may be reduced, while still providing acceptable vehicle and engine performance.

Note that there are a variety of approaches for reducing or adjusting the number of injections per cycle, several of which are shown in more detail with regard to FIG. 8, for example.

Specifically, FIGS. 8A, 8B, and 8C show a first example where three injections per cycle (810, 812, and 814) are used, which may include a pilot injection, a main injection, and a post injection, respectively. As a first example of adjusting the number of injections, FIG. 8B shows eliminating the post injection and providing a larger (e.g., longer) main injection 818 along with a pilot injection 816. Further, the timing of injections may be adjusted as well, for example the main injection of FIG. 8B may be earlier and/or later than that of FIG. 8A. Further, FIG. 8C shows how the three injection of FIG. 8A may be combined to a single main injection 820 of a still larger amount (e.g., longer duration).

Likewise, FIGS. 8D, 8E, and 8F show another example where two pilot injections (822 and 824) may first be combined into a single pilot injection 828 of a larger amount/longer duration, and then further combined into a single main injection 832.

Figure 8G:
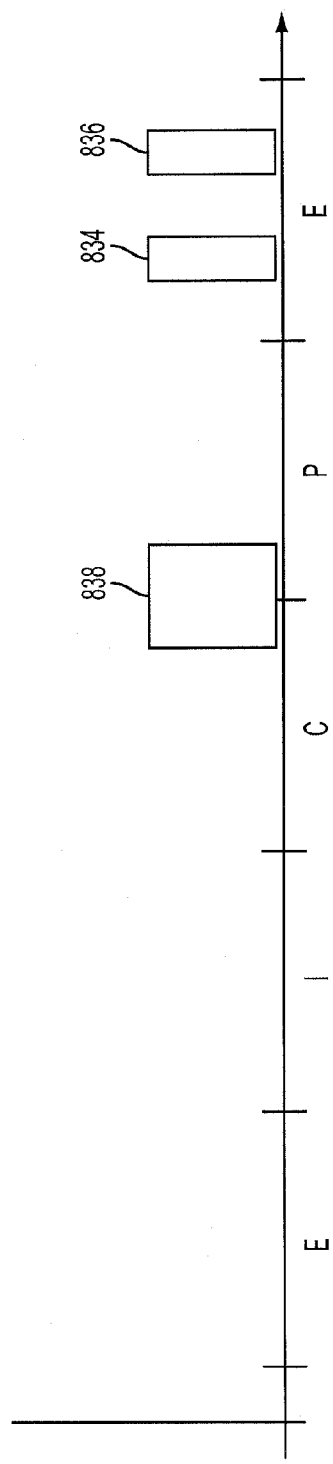
FIG. 8 shows example fuel injection timing diagrams.
Figure 8H:
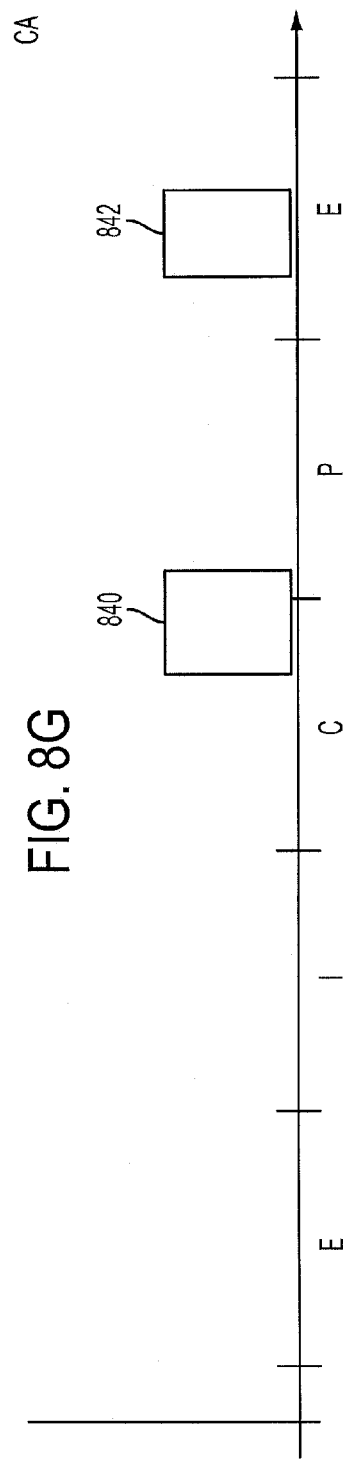
Figure 8I:
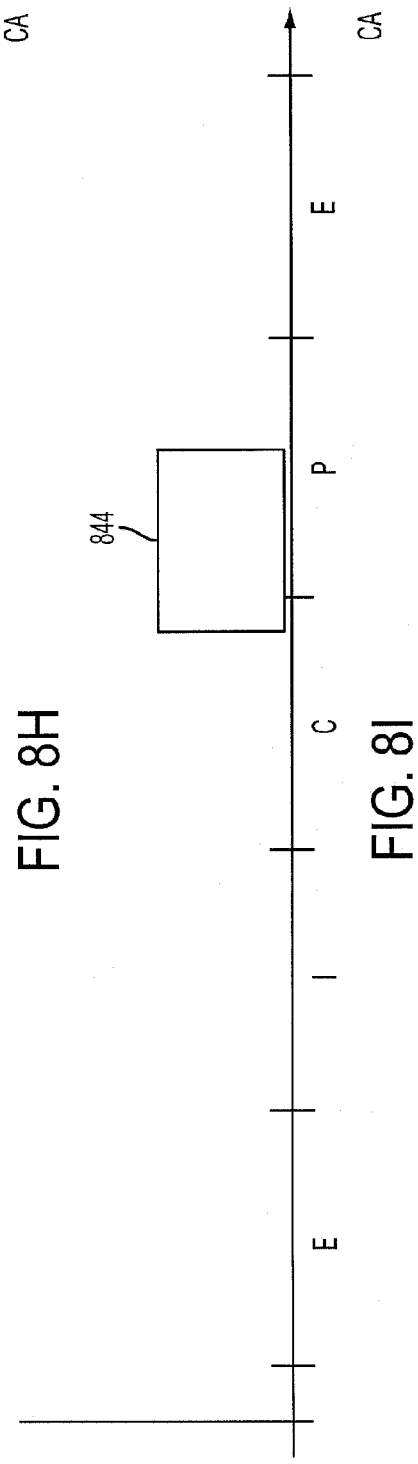

Finally, FIGS. 8G, 8H, and 8I show still more examples of combining post injections.

In still another example, a plurality of main injections may be used where to reduce piezo driver heat generation, the number of main injections may be reduced. Further still, the routine of FIG. 7 may include various priorities for adjusting and/or reducing the number of injections, such as first reducing a number of pre and post injections, and then reducing a number of main injections. Of course, other variations may also be used.

While the above figures show various examples where one or two or three injections per cycle may be combined, the above approach may be applied to a variety of injection modes and timings in an effort to reduce the number of piezo actuations per engine cycle and thereby reduce driver circuit generated heat in and/or around a controller, such as the ECU. Further, the adjustment in the amount of injection between the different injection modes may take into account various effects in efficiency of torque generation per amount of fuel injected at different crank angle (CA) timings. In this way, engine torque output can be maintained even when changing a number of injections per cycle. Further, the above examples show adjustment of timing for a single cylinder, although the modifications may be performed in a plurality, e.g., all, engine cylinders or only a portion of the engine cylinders, depending on operating conditions such as the degree of ECU over-temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various vehicle control units, such as engine, transmission, battery, motor, or other control unit. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of cooling an engine control unit (ECU) coupled to an engine in a vehicle having a cabin climate control system, comprising:
   operating the vehicle cabin climate control system according to a customer-based climate control setting during a first operating condition; and
   overriding said customer-based setting by enabling a climate control device when the customer-based setting is an off-setting, during a second operating condition including an ECU over-temperature condition.

2. The method of claim 1 wherein said customer-based setting includes a fan speed and the climate control device is a fan coupled in the cabin climate control system.

3. The method of claim 1, wherein the cabin climate control system is an automatic climate control system including a customer-based temperature setting, the method further comprising:
   automatically adjusting at least one of fan speed and a vent position in response to the customer-based temperature setting during said first operating condition; and
   overriding said customer-based temperature setting during said second operating condition.

4. The method of claim 1, wherein said overriding includes activating a fan increasing airflow from a cabin exterior to a cabin interior and through an enclosure of the ECU.

5. The method of claim 1, wherein said second operating condition further includes at least one of high engine speed and high load.

6. The method of claim 1, wherein said second operating condition further includes high ambient temperature.

7. The method of claim 1, wherein the device is a blower fan.

8. A method of cooling an engine control unit (ECU) coupled to an engine in a vehicle having a cabin climate control system, comprising:
   operating the vehicle cabin climate control system according to a customer-based climate control recirculation mode setting when an ECU temperature is below an override threshold; and
   overriding said customer-based recirculation mode setting when the ECU temperature is above said override threshold.

9. The method of claim 8, wherein said overriding includes adjusting a recirculation vent increasing airflow from a cabin exterior to a cabin interior and through an enclosure of the ECU.

10. The method of claim 9, wherein selection of the recirculation mode reduces airflow from exterior to the passenger compartment past the ECU via a closed vent.

11. The method of claim 8, further comprising returning to customer-based settings after said ECU temperature returns below the threshold temperature.

12. A method of cooling an engine control unit (ECU) coupled to an engine in a vehicle having a cabin climate control system, comprising:
   operating the vehicle cabin climate control system according to a customer-based climate control setting during a first operating condition; and
overriding said customer-based setting during a second operating condition including an ECU over-temperature condition, wherein said customer-based setting includes setting the climate control system off.

* * * * *